(12) United States Patent
Hershler

(10) Patent No.: US 9,619,421 B2
(45) Date of Patent: Apr. 11, 2017

(54) USB MEMORY DEVICE

(76) Inventor: Israel Hershler, Elad (IL)

(*) Notice: Subject to any disclaimer, the term of this patent is extended or adjusted under 35 U.S.C. 154(b) by 70 days.

(21) Appl. No.: 13/576,158

(22) PCT Filed: Feb. 1, 2011

(86) PCT No.: PCT/IB2011/050440
§ 371 (c)(1),
(2), (4) Date: Jul. 31, 2012

(87) PCT Pub. No.: WO2011/092676
PCT Pub. Date: Aug. 4, 2011

(65) Prior Publication Data
US 2012/0303882 A1    Nov. 29, 2012

Related U.S. Application Data

(60) Provisional application No. 61/300,042, filed on Feb. 1, 2010.

(51) Int. Cl.
*G06F 13/14* (2006.01)
*G06F 13/40* (2006.01)
*G06F 13/42* (2006.01)

(52) U.S. Cl.
CPC ........ *G06F 13/4027* (2013.01); *G06F 13/426* (2013.01)

(58) Field of Classification Search
CPC ................... G06F 12/1416; G06F 12/1433
USPC ................................. 711/103, 115
See application file for complete search history.

(56) References Cited

U.S. PATENT DOCUMENTS

| 7,660,938 B1* | 2/2010 | Chow et al. ............ 710/313 |
| 2006/0173980 A1 | 8/2006 | Kobayashi et al. |
| 2007/0043899 A1* | 2/2007 | Kurata ............ G06F 12/0246 711/103 |
| 2008/0010682 A1 | 1/2008 | Hamid |
| 2008/0059700 A1* | 3/2008 | Parkinson ............ 711/115 |
| 2008/0162755 A1 | 7/2008 | Minami |
| 2009/0019224 A1 | 1/2009 | Pocrass |

FOREIGN PATENT DOCUMENTS

| FR | 2891381 A1 | 3/2007 |
| JP | 2000209238 A | 7/2000 |
| JP | 2002114987 A | 4/2002 |
| JP | 2004-134740 A | 4/2004 |
| JP | 2006-113670 A | 4/2006 |
| JP | 2006114987 A | 4/2006 |
| WO | 2006084062 A2 | 8/2006 |
| WO | 2006094062 A1 | 9/2006 |
| WO | 2008003174 A1 | 1/2008 |

* cited by examiner

*Primary Examiner* — Gary Portka
(74) *Attorney, Agent, or Firm* — Mark M. Friedman

(57) ABSTRACT

A flash memory drive comprising: a male USB connector; a female USB connector; a flash memory chip to store file data; a computing processor, operatively connected to the flash memory chip, to manage transfers of data to and from the flash memory chip; and a changeover switch, operatively connected to the computing processor, to connect the computing processor to one of the male USB connector and the female USB connector; wherein there is no data communication link between the male USB connector and the female USB connector when the changeover switch is connected to one of the male USB connector and the female USB connector.

9 Claims, 3 Drawing Sheets

USB MEMORY DEVICE

BACKGROUND

1. Technical Field

Embodiments of the present invention relate generally to information storage devices and, more particularly, but not exclusively, to a portable flash memory drive.

2. Description of Related Art

It is common for computer users in both business and personal life to need to store selected files located on one computer on a portable device for transfer to another computer. Some examples include taking a work file from the office to continue working on it at home, bringing a file to a colleague or friend, or backing up important files.

As computer disk and the sizes have increased over the years, the format of popular file storage devices has changed. Floppy disks for example have become obsolete due to their limited storage capacity. Flash memory drives have become a popular storage medium due to their large capacity and compact form factor. Flash memory is a type of memory that can hold or store data without power. Therefore, a flash memory drive has the advantage of not needing a local battery or power source, and data can be stored for long periods of time without concern about replacing a battery or recharging. Flash drives are available in many forms, and can hold relatively large amounts of data, such as 32 or 64 gb.

Flash memory drives usually have a male Universal Serial Bus (USB) connector and plug into female USB connectors that are standard on computers. Upon connection the computer recognizes the device and the user can instruct the computer to read selected files from the device and/or write data from the computer to the device. Accordingly, if a user has information on a flash memory drive and wishes to transfer it to another flash memory drive, such as that of a friend or business colleague, he or she first has to connect it to a computer and transfer the information to the computer. Then the first device is removed and the second device is connected. Next the computer is instructed to write the information to the second device. Lastly, in many cases the information that has been temporarily stored on the computer may need to be deleted. This process is tedious and inconvenient. Further, if the data is confidential then it may be risky to use a third party computer. Another possibility is that if the computer has two USB ports available, the two USB devices could be connected at the same time, and the computer could affect the transfer without needing to store the data on the computer's local hard drive. This procedure may still be risky if the data is confidential and is still inconvenient in that it requires a host computer to perform.

BRIEF SUMMARY

According to an aspect of the present invention, there is provided a flash memory drive comprising:

(a) a male USB connector;
(b) a female USB connector;
(c) a flash memory chip to store file data;
(d) a computing processor, operatively connected to the flash memory chip, to manage trailers of data to and from the flash memory chip; and
(e) a changeover switch, operatively connected to the computing processor, to connect the computing processor to one of the male USB connector and the female USB connector;

wherein there is no data communication link between the male USB connector and the female USB connector when the changeover switch is connected to one of the male USB connector and the female USB connector.

According to another aspect of the present invention, there is provided a flash memory drive wherein the computing processor includes software to copy file data from one part of the flash memory chip to a different part of the flash memory chip.

According to yet another aspect of the present invention, there is provided a flash memory drive wherein the computing processor includes anti-virus software to check for problematic files and viruses in the file data stored on the flash memory chip.

According to yet another aspect of the present invention, there is provided a flash memory drive wherein the anti-virus software is operative to check for problematic files and viruses in file data as the file data is being transferred to or from the flash memory chip.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be further understood and appreciated from the following detailed description taken in conjunction with the drawings in which.

DETAILED DESCRIPTION

Figure 1:
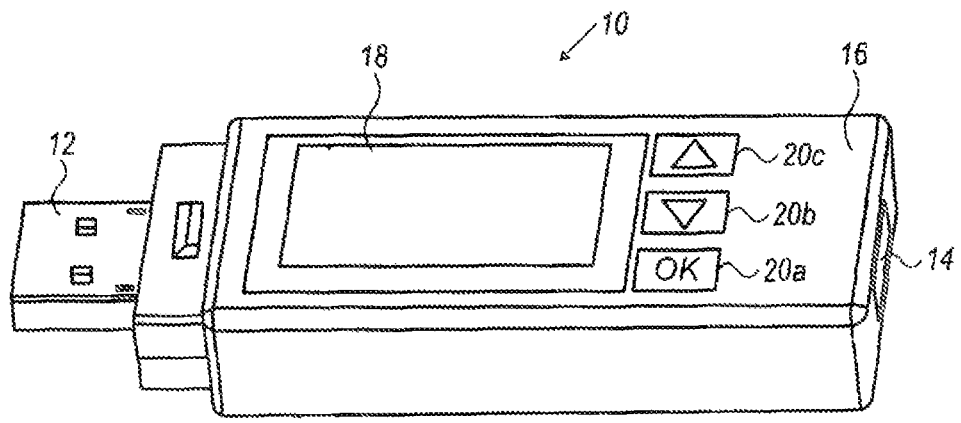
FIG. 1 is a perspective view of a USB memory device consistent with an embodiment of the present invention.

Reference will now be made in detail to embodiment(s) of the present invention, examples of which are illustrated in the accompanying drawings, wherein like reference numerals refer to the like elements throughout. The embodiment(s) is/are described below to explain the present invention by referring to the figures.

FIG. 1 shows a portable USB flash memory drive or device 10 according to some embodiments of the present invention. The device 10 includes a male USB connector 12 and a female USB connector 14 at opposing ends. For illustration purposes mate USB connector 12 is shown uncovered. A removable cap (not shown in this figure) may optionally be provided to cover this connector. Memory device 10 further includes a housing or case 16, a display 18, and optional control or push buttons 20. In the embodiment shown there are three push keys or buttons: an "ok" or "return" button 20a, a "down" button 20b, and an "up" button 20c.

The terms "USB memory", "USB flash memory drive" and/or "USB flash memory device" as used in the specification and claims which follow are intended to mean one or more of the following: "disk on key", USB flash drive, memory stick, or similar device having an interface with a USB port. Additionally, the terms are intended to mean any device with a form factor substantially similar to those noted hereinabove.

Figure 2:
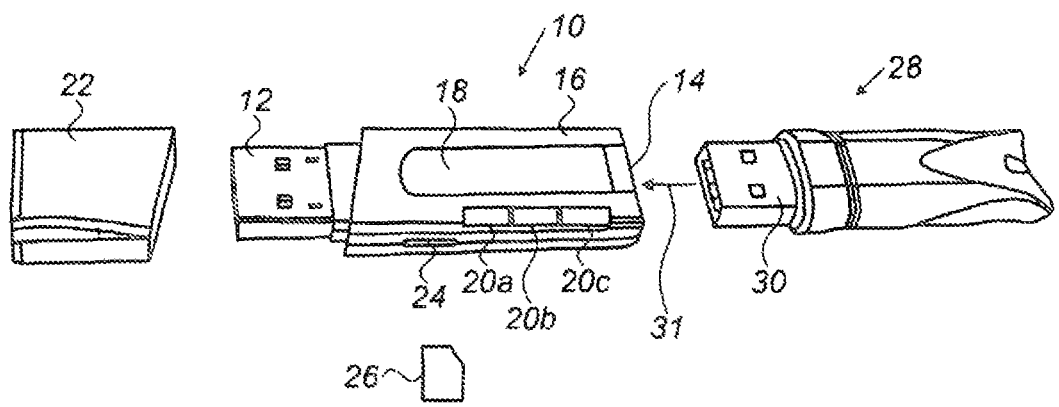
FIG. 2 is a perspective view of another embodiment of a USB memory device consistent with an embodiment of the present invention, showing the device being coupled with a separate USB memory device.

FIG. 2 shows another embodiment of USB memory device 10. In this embodiment the size and arrangement of display 18 and push buttons 20 are different from that of the embodiment of FIG. 1, and a cap 22 for male USB connector 12 is shown. In addition there is shown a memory card slot 24, configured to receive a memory card 26. The memory card slot and card may correspond to any type in standard use, such as for example SD or micro SD. Memory card slot 24 may also be configured to accept more than one type of memory card.

FIG. 2 also shows a separate USB memory device 28 having its own male USB connector 30, in the process of being coupled to memory device 10. As indicated by arrow 32, the devices may be coupled by sliding or pushing male connector 30 of device 28 into female USB connector 14 of device 10. Device 28 may be any of but not limited to the following: a conventional USB flash memory device, a USB hub connected to a USB flash memory device, or another USB memory device 10 of the present invention.

As will be described in greater detail below, USB memory device 10 includes hardware and software that enables it to operate in two modes, as either a slave or a host. Memory device 10 operates as a slave when male USB connector 12 is inserted into a female USB connector of a host computer or similar device. In that mode, memory device 10 transfers selected data files to, or receives and stores selected data files from the host computer, under the control of the host computer. When operating as a host, memory device 10 enables a user to manage files and folders of data stored within the device 10. In addition, if a separate memory device 28 is attached through female USB connector 14, a user of device 10 can manage files or folders stored in device 28, and can transfer selected data files between the two devices. This includes, for example, copying files from device 10 to device 28, or copying files from device 28 to device 10.

Figure 3:
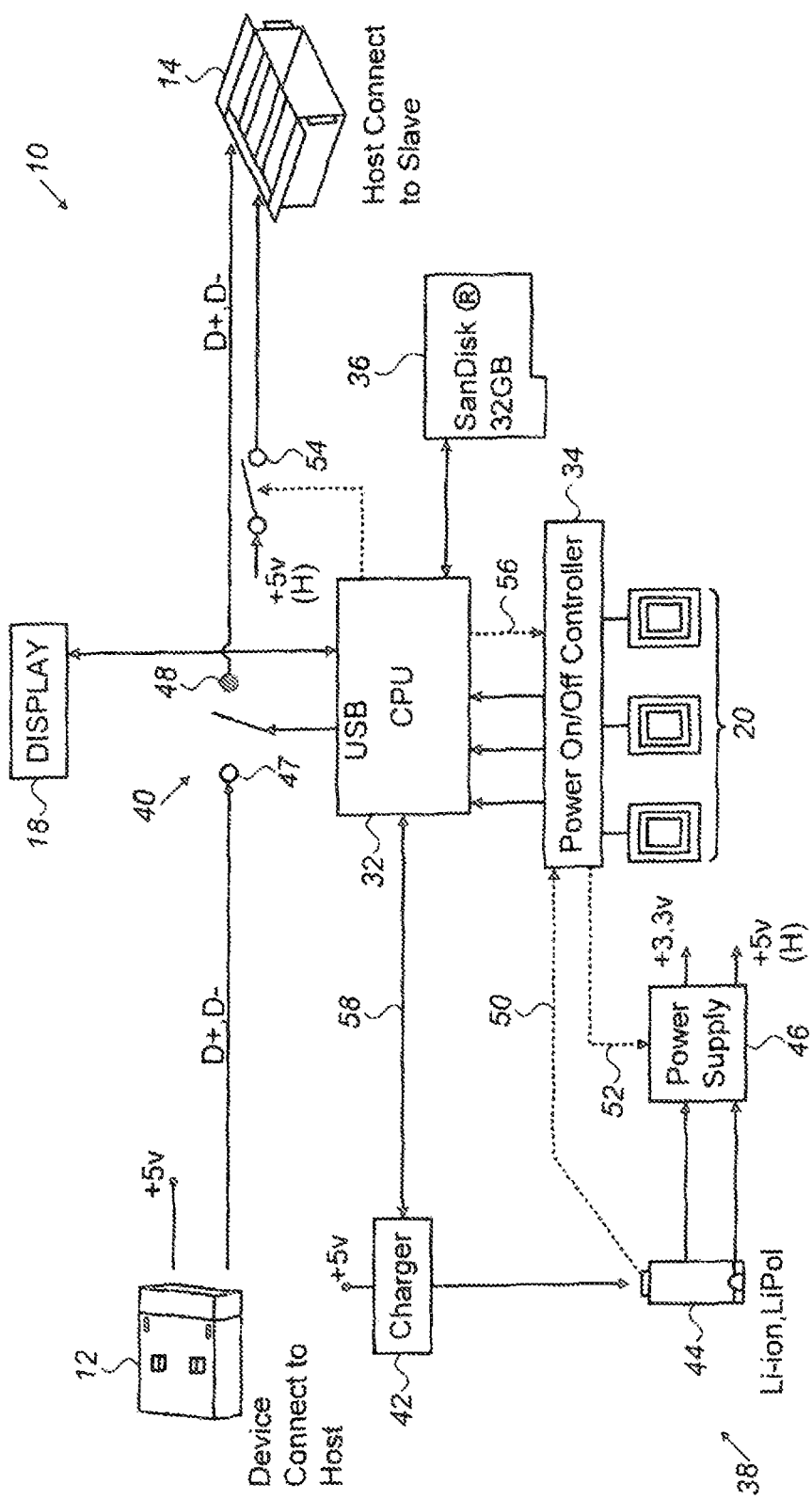
FIG. 3 is a block diagram of the hardware components of the USB memory device of FIGS. 1 and 2.

FIG. 3 is a block diagram showing the main hardware components of memory device 10 that contribute to functional operation of the device, according to some embodiments of the invention. As indicated, there is a CPU or processor 32, a power on/off controller 34, a flash memory 36, a power system 38, and a changeover switch 40. Also shown in the figure are male USB connector 12, female USB connector 14, display 18, and control or push buttons 20.

CPU 32 is an internal processor or device controller that runs suitable software to carry out the operations of device 10. CPU 32 includes ram and flash memory to store the software, an internal SPI bus as memory interface, or specific memory interface like NAND interface, input and output ports for keys and controls, Watch Dog timer, RTC (Real Time Clock Calendar), and an appropriate interface for USB peripherals and devices. The USB interface has slave, host, and OTG functions. An example of an adequate CPU is a 32 bit processor from the ARM LPC17 family of processors.

The on-board software is an operating system that may be standard or customized for the device. The software may be a FAT (File Allocation Table) file system, or similar low-level operating system. This type of software functions to manage the data inside the internal raw memory devices, and makes them usable for storing files. This software enables copying, transferring, receiving, and erasing data from an external memory device or from on-board memory, and allows automatic recognition and display of externally mounted memory devices. Additional software capabilities are discussed below.

Power on/off controller 34 is a power management device, built from a programmable logic, processor, or cpu device that is designed to manage the function of turning device 10 on and off. As indicated in FIG. 3 it is connected to control keys 20, to battery 44, to power supply 46, and to CPU 32. More particularly, controller 34 is always connected to battery 44, on line 50, from which it receives a constant supply of power. The amount of power consumed by controller 34 is very small. Controller 34 also controls, through line 52, the 3.3 volt output of power supply 46.

Controller 34 is always checking the status of keys 20. The controller is programmed to turn device 10 on or off when any key 20 is pressed and held down for a predetermined time. In some embodiments, device 10 is turned on when a key is held down for a relatively short time such as one-half second, and turned off when a key is held down for a relatively long time, such as 3 seconds or more. Other time durations for turn-on and turn-off may be selected as appropriate. Power on/off controller also gets signaling from the main cpu, on line 56, such as a request to turn off device 10.

Flash memory 36 may be any type of memory capable of storing data without power. The memory may be in the form of a chip, die, or other package, such as an SD micro format, with or without a socket. As indicated, both flash memory 36 and power on/off controller 34 are operatively connected to CPU 32. Flash memory 36 may have any capacity, such as 32 or 64 gb.

Power system 38 includes a charger 42, rechargeable battery 44, and power supply 46. The power system is configured to receive 5 volt power from an external computer USB port when male USB connector 12 is connected to an external computer or device that supplies such power, and to use that power to charge battery 44. Power system 38 performs this function not only when device 10 is operating in slave mode, but also when it is operating as a host, if device 10 is connected to an external power-supplying device through male USB connector 12 at that time.

The battery may be lithium ion, lithium polymer, or a similar type suitable for use in electronic devices. As indicated, battery 44 is connected to power supply 46, which processes the input power to provide two output voltages, +3.3 volts and +5 volts. The 3.3 volt output supplies power to the internal components of device 10, such as CPU 32 and to memory 36, for reading from and writing to memory 36. The +5 volt output is current limited and provides power or support to external devices connected to female USB connector 14. In FIG. 3, the designation "(H)" indicates +5 volts power for use when device 10 acts as a host, and needs to supply power to the external USB device attached to female USB connector 14. As noted, power on/off controller 34 is always connected to power from battery 44, while consuming very little power.

Changeover switch 40 is a switch inside device 10 that connects CPU 32 to either male USB connector 12 or to female USB connector 14. Changeover switch 40 is shown in FIG. 3 having pole positions 47 and 48. As indicated, changeover switch 40 will be in connection with male USB connector 12 when the switch is at pole position 47, and will be in connection with female USB connector 14 when the switch is at pole position 48. Changeover switch 40 is preferably a software-controlled electronic switch such as a double pole double throw switch or similar type.

Through use of changeover switch 40, device 10 is configured so that it does not act as a USB hub. More particularly, device 10 is configured so that when CPU 32 is in communication with an external device through male USB connector 12, there is no communication with any device that may be connected at female USB connector 14. Similarly, when the switch is at pole position 48 and CPU 32 is in communication with external devices attached to female USB connector 14, there is no communication with any external device that may be attached at male USB connector 12. For greater clarity, in the latter case, while there may be no data communication with an external device attached at male USB connector 12, as noted above device 10 may still receive power to charger 42 from the external device attached at male USB connector 12.

Since switch 40 is electronic and not mechanical, when device 10 is turned off the switch will also be turned off. The switch will be directed to pole position 47 when device 10 is acting as a slave, and will be at pole position 48 when device 10 is acting as a host or master, as discussed further below.

It is to be appreciated that as technology changes, some of the above elements may be integrated into CPU 32. These elements may include, for example, power on/off controller 34, charger 42, switch 40, and/or a touchscreen controller. CPU 32 may also have two different USB ports.

Display 18 may be any type of low power display or screen suitable for use with CPU 32. The display may be the passive type, viewable by ambient light. Alternatively, display 18 may be the active type, which provides internal backlighting and is accordingly viewable in a dark room or at night. Examples of display types are liquid crystal (LCD) or organic Led (OLED). The OLED type has the advantage over LCD of greater flexibility in producing images and greater visibility. The display will generally be sized to show 1-3 lines of information, but more lines may be displayed if appropriate. Display 18 generally provides user interface information, such as but not limited to file management, identification of connected devices, and memory status.

Keys or buttons 20 are provided to enable the user to operate device 10, i.e. as user interface. The functions provided may include, but are not limited to activating and turning off the device, "move up" and "move down" for selecting options presented on the screen, and "enter" or "ok" to indicate the desired selection. In some embodiments, display 18 may be a touchscreen, and the up/down buttons 20b and 20c may be virtual buttons on the screen. The enter key function could also be implemented on screen, so that physical button 20a would be used as an on/off key only.

As discussed above, USB flash memory device 10 has two major functions. The device 10 may act as a passive device, in which it is a general USB flash device or drive that receives power and signal controls from a host computer. Alternatively, device 10 may function as an active device, running as a stand-alone host or master. In this mode device 10 simulates the behavior of a host computer, which enables device 10 to operate an external device like a passive USB Flash memory device, and also to manage data stored on device 10 itself.

With reference to FIG. 3, when device 10 is turned off, power on/off controller 34 remains active and continually scans user keys 20 to detect if any key is pressed and held down for the required minimum length of time.

If device 10 is off, and is connected to a host computer through male USB connector 12, device 10 will receive +5 volts power from the USB bus of the external device. This will charge power to charger 42. The 5 volt signal received at this port indicates to CPU 32, through line 58, that power is being received through male USB connector 12. CPU 32 will activate slave mode by setting changeover switch 40 to pole position 47, to connect with male USE connector 12. In FIG. 3, the symbols "D+" and "D−" indicate a USB standard signal. Optionally, CPU 32 may indicate this connection status to a user by displaying words such as "connected to computer" on display 18.

If a user inserts device 10 into a computer USB port and then turns on device 10 by holding key 20 down for the required time, the device will activate in slave mode, since the device will first have received the +5 volts from the computer.

When in slave mode device 10 is on the USB network of the host computer, and acts like any other flash memory device. As noted, the external computer is in control and issues commands to CPU 32 to store data in memory 36 or to send data from memory 36 to the computer.

In order to operate as a host or master, the user turns on device 10 by holding down any key 20 for the required time, while device 10 is connected to an external device at female USB connector 14, or is not connected at either male connector 12 or female connector 14. More particularly, if device 10 is not connected at male USB connector 12 when it is turned on, device 10 enters into host mode.

Referring to FIG. 3, upon pressing key 20 for the required time, power on/off controller 34 will communicate to CPU 32 that this activity has occurred, CPU 32 will check that the 5 volt signal from the host has not been detected, and will know to turn on device 10 in host mode. CPU 32 will set changeover switch 40 to pole position 48, establishing data communication with female USB connector 14, and with the external USE device connected at that port. CPU 32 will also activate an internal +5 volt power supply via switch 54, to provide +5 volts of power, as a host, to the slave USB device connected at female USB connector 14. If at the time the device is turned on there is no external device connected at female USB connector 14, then no current will pass through that connector. Current or power will pass as soon as the external device is connected.

In host or master mode, CPU 32 running the on-board software simulates a host computer. In particular, CPU 32 can manage internal data stored in on-board flash memory 36, as well as manage the data in the external USB device connected to female USB connector 14. Managing data includes, but is not limited to browsing, viewing, deleting, moving, and copying files and folders. Data transfer and response times of device 10 are substantially similar to those of a host computer.

If device 10 is connected to a host computer at male USB connector 12 while operating in host mode, device 10 will charge but will not change to slave mode. In order to change to slave mode, device 10 should be turned off and connected to the host computer.

As noted above, USB flash memory device 10 does not act as a USB hub and does not enable communication with any device connected to female USB connector 14 while in communication with a computer connected to male USB connector 12. Accordingly, while in slave mode, device 10 will be a station on the USB network of the external computer, but a device connected to female USB connector 14 will not be on that USB network. More particularly, device 10 does not use hub logic or a hub chip in its operations. Rather, the inventor's device 10 includes suitable hardware and software that enables it to behave as a slave or a host device without the need of a hub. The device 10 may be said to use a low-level signaling layer, hardware, and software, to perform its data transfer operations.

The software provided on CPU 32 provides a variety of software functions and features. The operating system includes support for different file systems, including but not limited to FAT, FAT32, and NTFS file systems. Under these file systems any kind of data file may be supported. The software in addition is capable of identifying USB flash memory as well as memory contained on a memory card, such as an SD or micro SD card.

The software manages the graphic user interface and provides many functions for managing data organized in files and folders. These functions include, but are not limited to the following: opening folders, marking and unmarking any one folder or file, or any group of selected folders or files, including all folders or files. Similarly any file, folder, or marked group of files or folders may be deleted, cut and pasted, or copied internal to, or between any two of internal USB flash memory 36, memory on a memory card 26, or memory in an attached external device. In particular, the software can copy a selected file or files from one part or folder of flash memory 36 to another part or folder of flash memory 36. All of these functions are performed while device 10 acts as a host, without being connected to a host computer or using processing from a host computer.

The user interacts with device 10 through push buttons 20 and a graphical user interface displayed on screen 18. The user interface enables a user to drill down through hierarchical or tree structured folders or directories to identify and locate specific files and folders, in both internal and external memory devices. Further, the software can run a search file function, by inserting the name of a file or folder, and requesting that a search be performed in the internal or external memory devices. The software identifies local memory and external memory, and uses visual aids such as arrows to indicate direction of transfer.

The graphical user interface may also be configured to indicate other useful functions such as the status of battery 44, notification of external devices connected at interfaces 12 and 14, available flash memory and their sizes, and the size and other information such as attributes of files and folders. Further, during copying and pasting processes, a dynamic status bar may be shown to show the direction of file movement or transfer.

Figure 4:
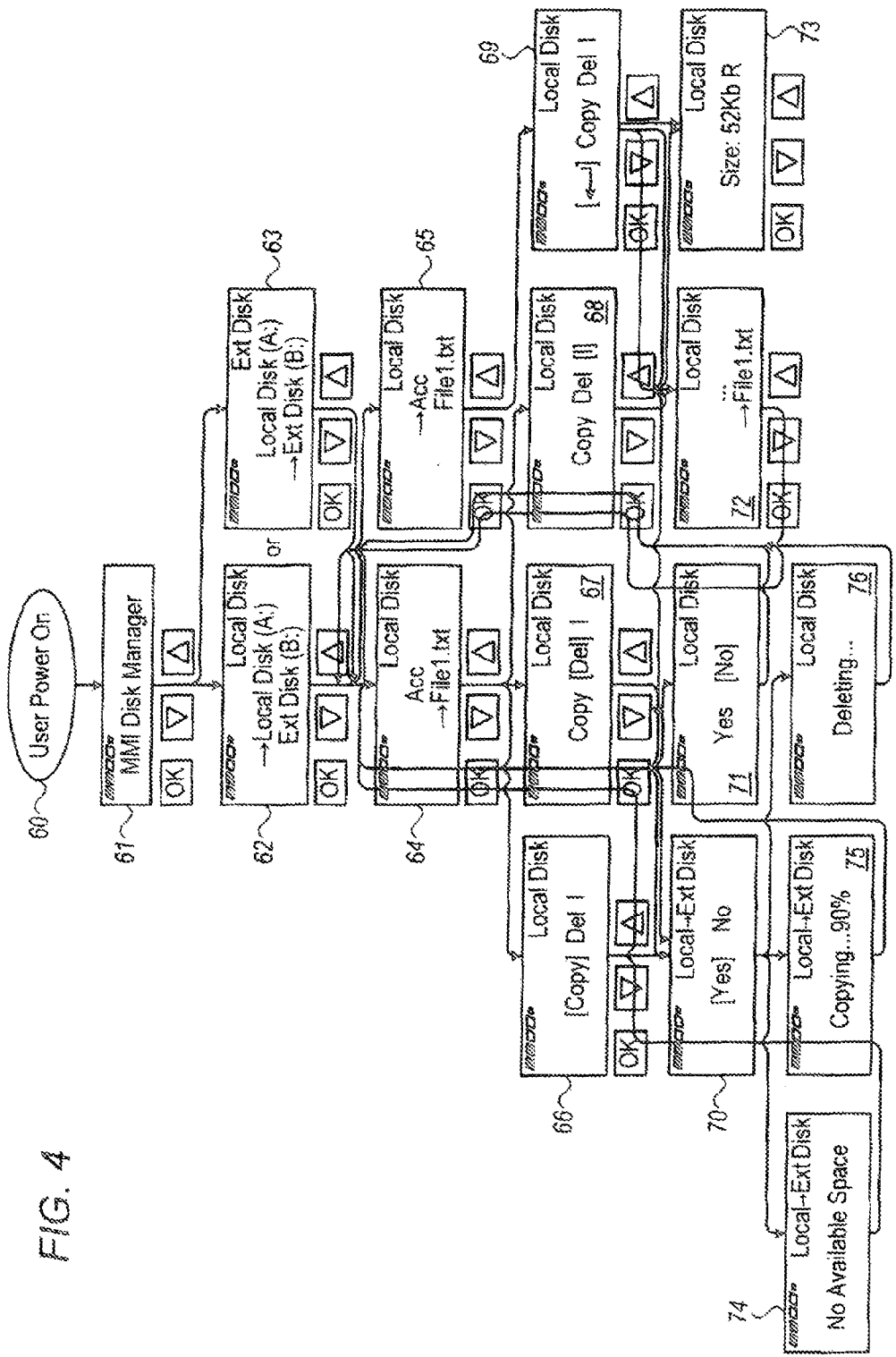
FIG. 4 is a flow chart illustrating a portion of a software program operating the USB memory device of FIGS. 1 and 2.

A flow chart illustrating a portion of the file management capability of device 10 is shown in FIG. 4. The user powers on the device into host mode in module 60. The disk manager or graphical user interface appears in module 61, and the user may tap a button to indicate that he or she wishes to perform a file management function. The user chooses local disk (A) in module 62 or external disk (B) in module 63. In module 64 the user chooses to operate on a file "File1.txt", and in module 65 the user chooses a folder named "Acc". In modules 66, 67, and 68 the user chooses the functions of copy, delete, and obtain information (i) respectively. In module 69 the user pushes "ok" to drill down into folder "Ace" which was selected in module 65. In modules 70 and 71 the user answers a prompt "yes" or "no" from the system to confirm that he or she wishes to proceed with the file management function. If the user chooses "yes", then module 70 leads to feedback modules 74, 75, and 76, which indicate, in respective order, that there is no available space for a requested file transfer, that a requested copy is proceeding and its status (90% complete), and that a delete request is proceeding. Lastly, module 72 shows the file located in folder "Ace", and module 73 provides information about a file, i.e. its size 52 kb and attribute "R".

Device 10 may also include an embedded anti-virus software engine to perform a virus check on any or all files located in internal flash memory 36, memory card 26, or in an external device attached to female USB connector 14. The anti-virus software could also be operative during file transfers between devices, to detect and prevent the spread of any problematic or suspicious files. The files could be checked while in transit, or alternatively the files could be directed to a receiving folder and checked when received. The anti-virus scanning could be performed upon user request, or upon specified procedures programmed into the software, such as when the device is turned-on, or whenever files are transferred. A variety of actions may be taken when problematic files are detected. For example, the files may be marked, deleted, blocked or quarantined so as to be rendered inoperative, the file names may be changed so they are not executable, or the file attributes or other property may be changed, such as being made "read only". The software may prompt the user at the time of detection, or may be pre-set to a default action by the user.

Although selected embodiment(s) of the present invention has/have been shown and described, it is to be understood that the present invention is not limited to the described embodiment(s). Instead, it is to be appreciated that changes may be made to this/these embodiment(s) without departing from the principles and spirit of the invention, the scope of which is defined by the claims and the equivalents thereof.

The invention claimed is:

1. A flash memory drive comprising:
   (a) a male Universal Serial Bus (USB) connector;
   (b) a female USB connector, the female USB connector and the male USB connector not being in data communication with one another;
   (c) a flash memory chip to store file data;
   (d) a computing processor, operatively connected to the flash memory chip, to manage transfers of data to and from the flash memory chip, and to manage movement and storage of file data between parts of the flash memory chip; and,
   (e) a changeover switch, operatively connected to the computing processor, and activatable by the computing processor, for establishing a data communication link between the computing processor and one of the male USB connector or the female USB connector, and to thereafter switch said connection from between the computing processor and the one of the male USB connector and female USB connector, to between the computing processor and the other of the male USB connector and the female USB connector.

2. The flash memory drive according to claim 1, wherein the computing processor includes software to copy file data from one part of the flash memory chip to a different part of the flash memory chip.

3. The flash memory drive according to claim 1, wherein the computing processor includes anti-virus software to check for problematic files and viruses in the file data stored on the flash memory chip.

4. The flash memory drive according to claim 3, wherein the anti-virus software is operative to check for problematic files and viruses in file data as the file data is being transferred to or from the flash memory chip.

5. A flash memory drive for operation as either a master or a slave comprising:
   (a) a male Universal Serial Bus (USB) connector;
   (b) a female USB connector, said female USB connector and said male USB connector not being in data communication with each other;

(c) a flash memory chip for storing file data;

(d) a processor in electronic communication with said flash memory chip for managing transfers of file data to and from said flash memory chip, and to manage movement and storage of file data between parts of the flash memory chip; and, (e) a changeover switch in electronic communication with said processor for establishing a data communication link between said processor and one of:
  i) said male USB connector, for operation of the drive as a slave; or
  ii) said female USB connector, for operation of the drive as a master: and, the changeover switch to thereafter switch said connection from between the computing processor and the one of the male USB connector and female USB connector, to between the computing processor and the other of the male USB connector and the female USB connector.

6. The flash memory drive according to claim 5, wherein said processor includes software to copy file data from one part of said flash memory chip to a different part of said flash memory chip.

7. The flash memory drive according to claim 5, wherein said processor includes anti-virus software to check for problematic files and viruses in the file data stored on said flash memory chip.

8. The flash memory drive according to claim 7, wherein the anti-virus software is operative to check for problematic files and viruses in file data as the file data is being transferred to or from said flash memory chip.

9. The flash memory drive according to claim 1, wherein the computing processor is configured to manage movement and storage of file data between parts of the flash memory chip, when out of data communication with a host computer.

* * * * *